United States Patent
Shomer et al.

(10) Patent No.: US 11,991,149 B2
(45) Date of Patent: May 21, 2024

(54) SYSTEM AND METHOD FOR ANALYTICS BASED WAF SERVICE CONFIGURATION

(71) Applicant: RADWARE, LTD., Tel Aviv (IL)

(72) Inventors: Ayelet Shomer, Shoham (IL); Dekel Cohen, Neve Yarak (IL)

(73) Assignee: RADWARE, LTD., Tel Aviv (IL)

( * ) Notice: Subject to any disclaimer, the term of this patent is extended or adjusted under 35 U.S.C. 154(b) by 139 days.

(21) Appl. No.: 17/125,818

(22) Filed: Dec. 17, 2020

(65) Prior Publication Data

US 2021/0194852 A1 Jun. 24, 2021

Related U.S. Application Data

(60) Provisional application No. 62/950,644, filed on Dec. 19, 2019.

(51) Int. Cl.
*G06F 21/00* (2013.01)
*H04L 9/40* (2022.01)

(52) U.S. Cl.
CPC ...... *H04L 63/0263* (2013.01); *H04L 63/0236* (2013.01); *H04L 63/1425* (2013.01)

(58) Field of Classification Search
CPC ............. H04L 63/0263; H04L 63/0236; H04L 63/1425; H04L 2463/121; H04L 67/02
See application file for complete search history.

(56) References Cited

U.S. PATENT DOCUMENTS

| | | | | |
|---|---|---|---|---|
| 8,566,919 B2 * | 10/2013 | Meisel | ................ | H04L 63/0218 709/224 |
| 10,158,658 B1 * | 12/2018 | Sharifi Mehr | ...... | H04L 63/1425 |
| 10,523,701 B2 * | 12/2019 | Peterson | ............. | H04L 63/1433 |
| 2010/0199345 A1 * | 8/2010 | Nadir | ...................... | H04L 63/14 726/22 |
| 2011/0099482 A1 * | 4/2011 | Koved | .................... | H04L 67/02 715/741 |
| 2014/0207917 A1 * | 7/2014 | Tock | ................... | H04L 41/0895 709/220 |
| 2016/0164837 A1 * | 6/2016 | Wu | ........................ | H04L 67/02 726/11 |
| 2016/0182454 A1 * | 6/2016 | Phonsa | ............... | H04L 63/0263 726/11 |
| 2019/0349320 A1 * | 11/2019 | Karuppusamy | ......... | H04L 51/02 |
| 2020/0036615 A1 * | 1/2020 | Lewis | ................ | H04L 63/0218 |
| 2020/0314066 A1 * | 10/2020 | Cruz Farmer | ...... | H04L 63/0245 |
| 2021/0034754 A1 * | 2/2021 | Xiang | ................. | G06F 11/3688 |
| 2021/0036991 A1 * | 2/2021 | Owens | ................. | H04L 63/126 |

FOREIGN PATENT DOCUMENTS

| | | | | |
|---|---|---|---|---|
| CN | 107426028 A | * | 12/2017 | |
| CN | 108494766 A | * | 9/2018 | |
| WO | WO-2018135964 A1 | * | 7/2018 | ............. G06F 21/30 |

* cited by examiner

*Primary Examiner* — Michael M Lee

(74) *Attorney, Agent, or Firm* — M&B IP Analysts, LLC

(57) ABSTRACT

A system and method for configuring a web application firewall (WAF) is provided. The method includes continuously receiving requests related to a first WAF, each request indicative of network traffic directed to a web application protected by the WAF; enriching each received request by associating each event with information from an enrichment source; periodically analyzing the enriched requests; generating at least one network traffic rule based on periodically generated analysis; and configuring at least a second WAF to perform the network traffic rule.

21 Claims, 5 Drawing Sheets

SYSTEM AND METHOD FOR ANALYTICS BASED WAF SERVICE CONFIGURATION

CROSS-REFERENCE TO RELATED APPLICATIONS

This application claims the benefit of U.S. Provisional Application No. 62/950,644, filed on Dec. 19, 2019, the contents of which is hereby incorporated by reference.

TECHNICAL FIELD

The disclosure generally relates to web application firewalls (WAFs) and, particularly, to configuration of WAFs.

BACKGROUND

Web applications are advantageous for a number of reasons, among them that the application can be updated easily by the author(s) from a single point. This eliminates the possibility of multiple versions of software 'in the wild,' and provides the author with more control over their software. Web applications also provides users with the ability to use applications without downloading special software, libraries, plugins, and so on. Web applications, however, are vulnerable to web-based threats, and, as such, require security solutions.

To be protected, companies heavily invest in security solutions, such as anti-virus software and firewalls. However, as security solutions become more and more advanced, so do web attacks. Web attacks may be in form of viruses, worms, Trojan horses, script-based attacks, system intrusions, and many others. Such attacks allow the attacker to control computers, access confidential information, and destroy valuable data.

One such solution is a web application firewall (WAF). A WAF is typically deployed in-line of traffic between clients and a server hosting protected web-applications. A WAF filters, monitors, and blocks hypertext transfer protocol (HTTP) traffic to and from a web application. This is achieved by supplying the WAF with authorization rules or security policies to determine what traffic should be filtered, blocked, or let through. The security policies are configured based on known attack patterns or vulnerable application-paths. Such policies may be defined as blocklist (what should be blocked) or whitelist (what should be allowed).

One solution suggests manually configuring WAF polices. However, such an approach is inefficient as it requires advance knowledge of known attack patterns or paths. Configuring a WAF for controlling access to an application can be a time consuming and human-error-prone process. Furthermore, customers' requirements are not static and indeed fluctuate based, for example, on their development and business needs. This may lead to outdated, flawed, and, therefore, even dangerous misconfigurations of WAF. Additionally, some of the required values for configuration are not obvious, which complicates both onboarding and re-configuration of the WAF Service. This complexity affects not only the time required for configuration, but the quality of such a configuration as well.

Furthermore, as web applications are dynamically changed by programmers and the system administrator often does not have full control over all these rapidly occurring changes, as many are reported after incidence, if at all. Thus, the policy is statically enforced, and, thus, the web applications remain vulnerable.

Other solutions suggest crawling the web-applications to learn the structure of an application and generate policies based on the crawling. As this solution is not static, crawling cannot be rapidly adapted to capture changes in web applications. In today's computing environment, applications may change every a few seconds (e.g., online retail sales).

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein includes a method for configuring a web application firewall (WAF). The method comprises continuously receiving requests related to a first WAF, each request indicative of network traffic directed to a web application protected by the WAF; enriching each received request by associating each event with information from an enrichment source; periodically analyzing the enriched requests; generating at least one network traffic rule based on periodically generated analysis; and configuring at least a second WAF to perform the network traffic rule.

Certain embodiments disclosed herein includes a method for A system for a process for configuring a web application firewall (WAF), comprising: a processing circuitry; and a memory, the memory containing instructions that, when executed by the processing circuitry, configure the system to: continuously receive requests related to a first WAF, each request indicative of network traffic directed to a web application protected by the WAF; enrich each received request by associating each event with information from an enrichment source; periodically analyze the enriched requests; generate at least one network traffic rule based on periodically generated analysis; and configure at least a second WAF to perform the network traffic rule.

BRIEF DESCRIPTION OF THE DRAWINGS

The subject matter of the disclosure is particularly pointed out and distinctly claimed in the claims at the conclusion of the specification. The foregoing and other objects, features and advantages will become apparent and more readily appreciated from the following detailed description taken in conjunction with the accompanying drawings, in which:

DETAILED DESCRIPTION

Figure 1:
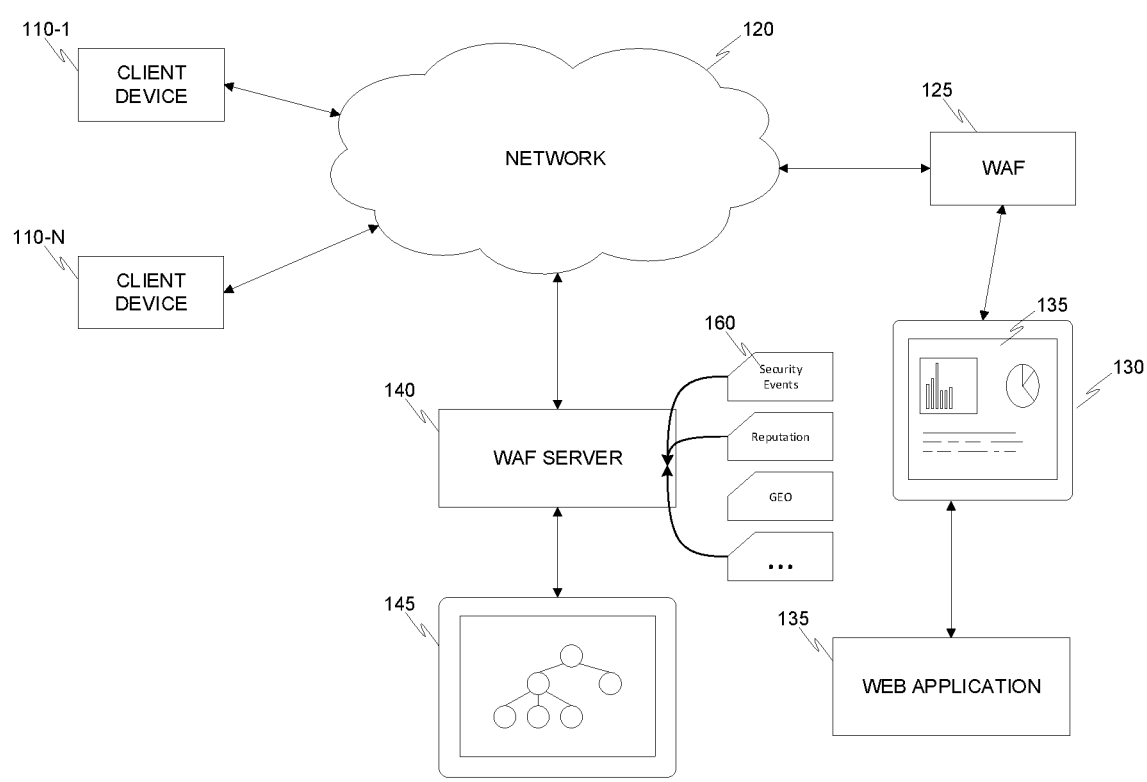
FIG. 1 is an illustration of system implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic illustration of a network diagram 100 utilized to describe the various embodiments. A plurality of client devices 110-1 through 110-N (collectively referred to as client devices 110 or individually as client device 110), are communicatively connected to a network 120. Each client device 110 includes a machine which supports the execution of an operating system (OS). The OS allows execution of higher-level applications, such as a web browser which is operative for accessing, among others, web pages, and can, for example, generate and process HTTP requests directed at a web application.

A client device 110 may be a user device, such as a PC, laptop, tablet, a smartphone, and the like, or, in another embodiment, a virtual machine, container, and the like. The client device 110 is used for accessing a server 130 over a network 120. The server 130 is configured to host a protected web application 135. The server 130 may be a physical machine or a virtual machine. The server 130 may be deployed in a cloud-computing platform, a datacenter, or as an on-premise configuration.

The network 120 may be configured to provide connectivity of various sorts, as may be necessary, including, but not limited to, wired and/or wireless connectivity, including, for example, local area network (LAN), wide area network (WAN), metro area network (MAN), worldwide web (WWW), Internet, and any combination thereof, as well as cellular connectivity. The network 120 further provides connectivity for a web application firewall (WAF) 125, which is configured to control access to the protected web application 135.

A WAF server 140 is connected with the WAF 125 via the network 120. The WAF server 140 is operative for receiving event logs generated based on access requests received by the WAF 125. In an embodiment, the WAF server 140 may receive the access requests directly from the WAF 125.

According to the disclosed embodiments, the WAF server 140, which is discussed in more detail below, is configured to generate enriched data based on the access requests.

To this end, the WAF analytic server 140 is configured to access a plurality of data sources 160. The data sources 160 may include Internet-based services (not deployed in the backbone network 120). Examples for such services include WHOIS, FarSight DNSDB, ShadowServer, Shadan, GeoIP, treat intelligence services, reputation services, and the like. The data sources 160 may further include Remote Authentication Dial-In User Services (RADIUS), DNS services, DHCP services, DPI services, and the like.

Additional data that may be included in or provided by data sources 160 include flow data (e.g., NetFlow), data from SOC and NOCs, data from attack repositories, and threat intelligence, Border Gateway Patrol (BGP) data, other types of networking data, Simple Network Management Protocol (SNMP) data, data from Remote Authentication Dial-In User Services (RADIUS), Policy and Charging Rules Function (PCRF) data, active domain name service (DNS) queries, DNSFlow, logs, data from Internet sources such as WHOIS, data from FarSight DNSDB, Geolocation data (e.g., MaxMind data), GeoIP data from Layer 7 entities (e.g., FW, ADCs, DPIs, etc.), and the like.

Enriched data may include associating an access request with IP reputation feeds, whitelists, Open Web Application Security Project (OWASP) tagging, and events (such as disaster feeds, financial market feeds, news, etc.), to name a few examples.

The WAF analytic server 140 may query one or more data sources 160 with an IP address (source/destination), a URL, a URI, or any network parameter identified in the access request.

In an embodiment, the enriched data may be stored in a graph-based storage, such as storage 145. By storing the enriched data in this manner, a data sample (e.g. vertex-edge-path) may be marked as 'dirty' or 'clean', indicating that a previous WAF rule (or assumption about traffic) may no longer be valid. As an example, a first IP address may be migrated in an IP geolocation database from a first country to a second country. The WAF 125 was configured to deny requests from the second country. However, the first IP address was not included at the time of that configuration. Based on the change in the geolocation update, the WAF server 140 is configured to generate an updated rule and sends it to the WAF 125 for reconfiguration.

It should be noted that the WAF analytic server 140 may be realized as a physical machine (example of which is provided in FIG. 5), a virtual entity (e.g., a virtual machine, a software container, and the like). The WAF analytic server 140 may be deployed in a cloud computing platform and/or in an on-premise deployment. The cloud computing platform may be, but is not limited to, a public cloud, a private cloud, or a hybrid cloud. When installed in the computing platform, the defense system may operate as SaaS. Regardless of the implementation, the WAF analytic server 140 is configured to determine a set of security policies and/or rules so to set the WAF 125 accordingly. The WAF 125 may be a network appliance or a cloud service.

It should be noted that the functionality of the WAF analytic server 140 may be integrated in the WAF 125. It should be further noted that one WAF 125 and WAF analytic server 140 are depicted in FIG. 1, merely for the sake of simplicity, the embodiments disclosed herein can be applied to a plurality of such elements. The various elements may be in different geographical locations. Further, when a plurality of WAFs is connected or otherwise configured by the WAF analytic server 140 then generated rules (or policies) are shared among all WAFs. Typically, such WAFs would protect web applications of the same customer.

Figure 2:
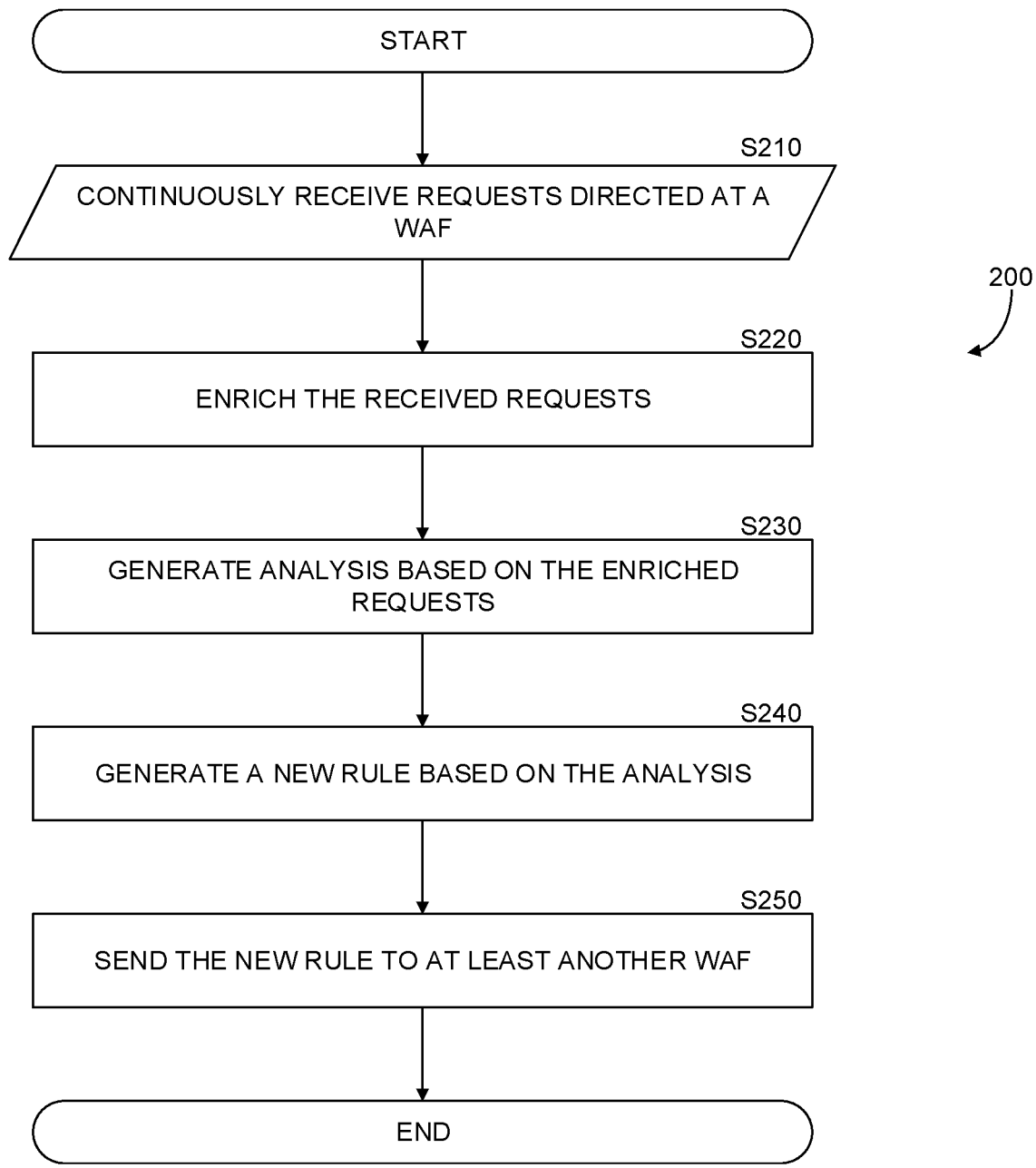
FIG. 2 is a flowchart of a method for configuring a WAF based on analytics of received requests according to an embodiment.

FIG. 2 is an example flowchart 200 of a method for configuring a WAF based on analytics of received requests, implemented in accordance with an embodiment. In an embodiment the method is performed by a WAF server.

At S210, requests directed at a first WAF are continuously received. A request may include network parameter, such as an IP address, a URI, a URL, and the like. The requests may be received as event logs, or may be received as a stream of data, to name a couple of examples.

At S220, the received requests are enriched to generate enriched requests. Enrichment of requests may include associating a request with IP status information, such as IP reputation feeds, IP geolocation databases, whitelists, blacklists, OWASP tagging, and global events. Global events may be based on disaster feeds, news (e.g., internet traffic blocked from a country/region due to war or natural disaster), financial market feeds, and so on.

In an embodiment, the request enrichment further involves associating the request with a timestamp. In an embodiment, the enrichment of requests may include data retrieved from one or more data sources, examples of which are provided above.

In an embodiment, the enriched requests may be stored in a database, such as a graph database. In an embodiment, the database includes a retention policy, so that requests are kept for a predefined period of time.

At S230, an analysis is generated based on the enriched requests. In an embodiment, analysis may be performed based on changes to the enriched requests. For example, analysis may be performed based on addition of a new enrichment source, generation of a new edge in the graph database, or new/updated labels based on user input. A user label (or tag) occurs when a user indicates, for example, that a specific request is whitelisted, blacklisted, exempt from one or more rules, and the like. For two examples of enriched request analysis, see FIGS. 3 and 4.

At S240, a new rule is generated based on the analysis. In some embodiments, S240 includes updating an existing rule based on the analysis. The new rule is generated in a notation (syntax) complies with the WAF receiving the access requests (e.g., WAF 125).

At S250, the new rule may be shared with at least another WAF, which is not the first WAF. In an embodiment, all WAFs which are communicatively connected to the WAF server can benefit from each other's rules. Setup of a new WAF is thus aided, and time spent is reduced, since the WAF does not need to experience a massive flow of traffic and scenarios to determine rules which would allow it to operate.

Figure 3:
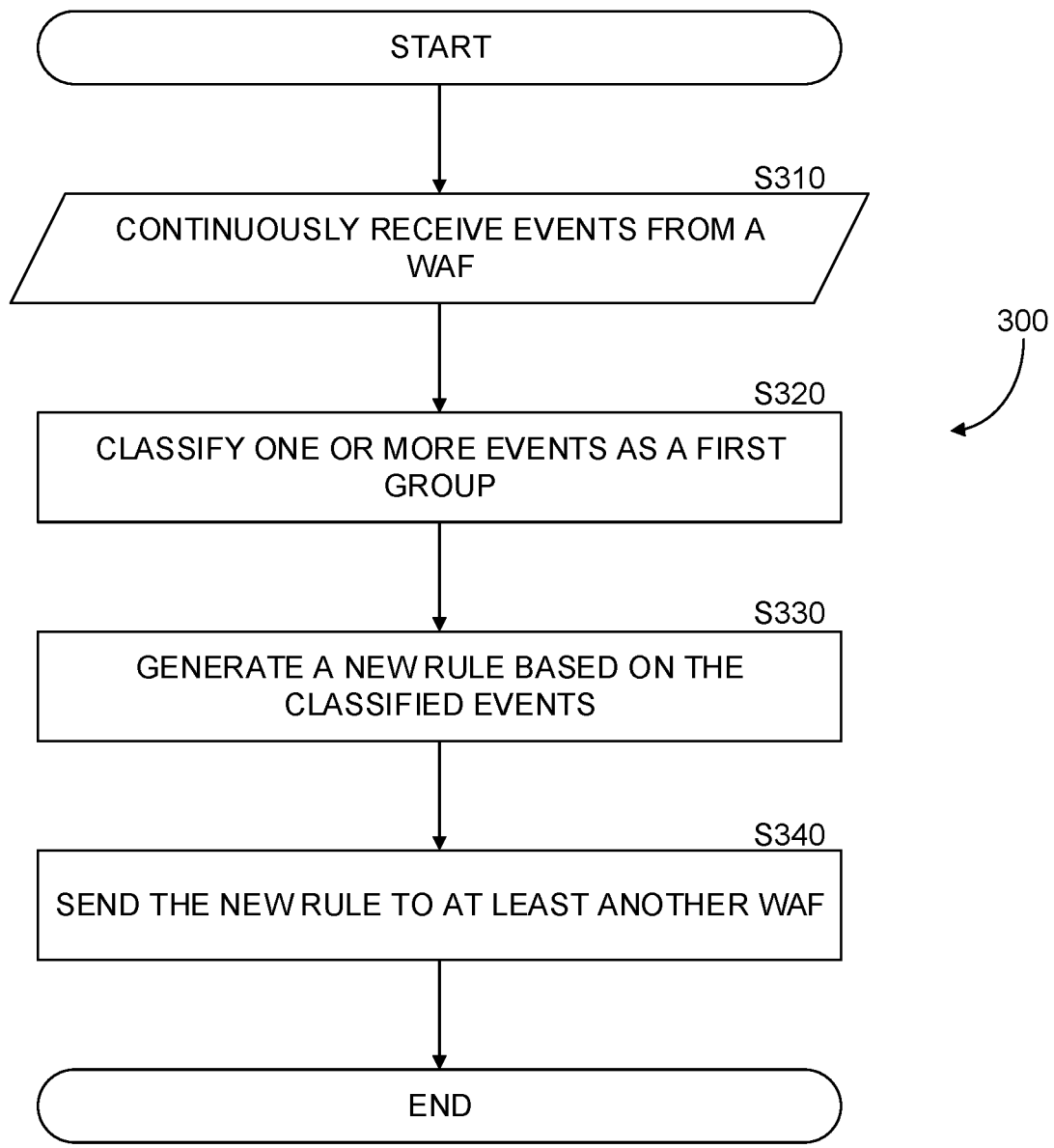
FIG. 3 is a flowchart of a method for WAF request classification and rule generation according to an embodiment.

FIG. 3 is an example flowchart 300 of a method for WAF request classification and rule generation, implemented in accordance with an embodiment. WAF request classification is one example of a method for performing analysis of enriched requests. A WAF request may include a WAF event.

At S310, events are continuously received from a WAF to a WAF server. An event may include a modified rule, which is a rule that may be labeled (or tagged) by a user or maybe modified to indicate a change in allowing or denying web traffic. An event is based on allowed or denied network traffic. Here the requests are received as event logs.

At S320, one or more events are classified as a first group. Classification may be based on a network parameter, such as a URI, an IP address, an origin, destination, and so on.

At S330, a new rule is generated based on the classified events of the first group. For example, the first group may include events which allowed traffic originating from a first IP address. The WAF server then generates a rule that traffic from the first IP address should be allowed. As noted above, a new rule may be an update of an excining rule.

At S340, the WAF is configured with the new rule. Further, the new rule is sent to at least another WAF. By providing another WAF with a rule which was generated based on detecting patterns in network traffic in other WAFs, setup time for another WAF is reduced and accuracy is potentially improved. Further, by associating the events with a timestamp, the WAF server may determine that some events are outdated, and that an IP address which was considered safe at one point in time may be unsafe at another point in time, or vice versa.

Figure 4:
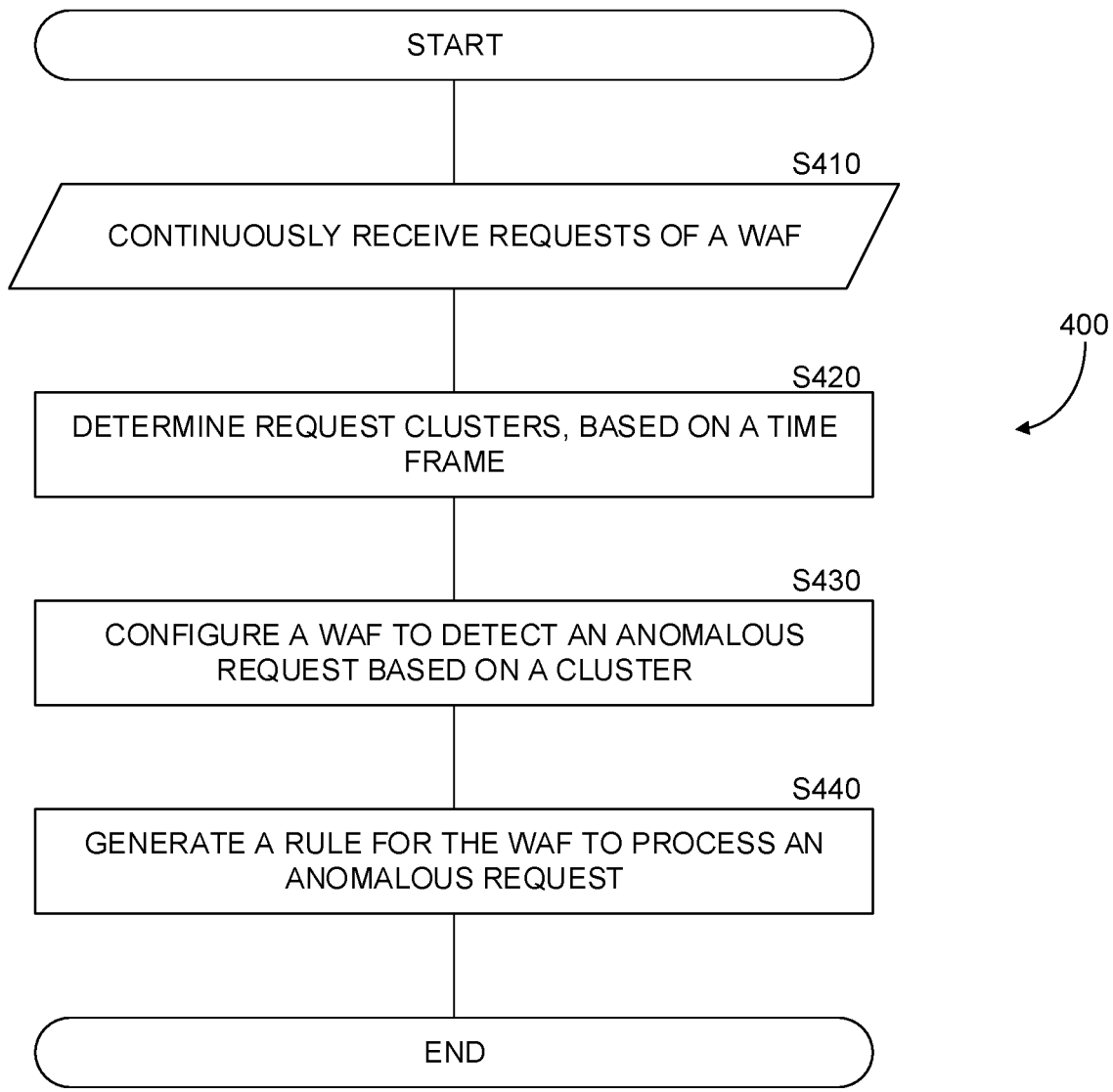
FIG. 4 is a flowchart of a method for WAF request clustering and rule generation, implemented in accordance with an embodiment.

FIG. 4 is an example flowchart 400 of a method for WAF request clustering and rule generation, implemented in accordance with an embodiment. WAF request clustering is another example of a method for performing analysis of enriched requests.

At S410 requests directed to a WAF are continuously received. In an embodiment, the requests may be received as an event log. In another embodiment the requests may be received by a WAF server as a data stream. In some embodiments, the WAF continuously receives events, which is an indication of network traffic which was either allowed or blocked.

At S420, the received requests are clustered based on a timeframe associated with each received request, thereby generating at least one cluster. In an embodiment, requests within a first generated cluster occur within a timeframe.

At S430, an anomalous request (or event) based on the generated cluster is detected. An anomalous request may occur, for example, when a request which is typically followed or preceded by at least another request, is now received without the at least another request. Though this does not always necessarily indicate a vulnerability, it may be advisable to check if the resource which is being requested is not open to abuse. This allows an operator of the WAF service to be more cognizant of potential risks.

At S440, a rule is generated by the WAF server based on the generated first cluster, to determine how to process the anomalous request. The rule may be sent from the WAF server to other WAFs, which again reduces set uptime and provides continuous, accurate reflections of network traffic threats.

Figure 5:
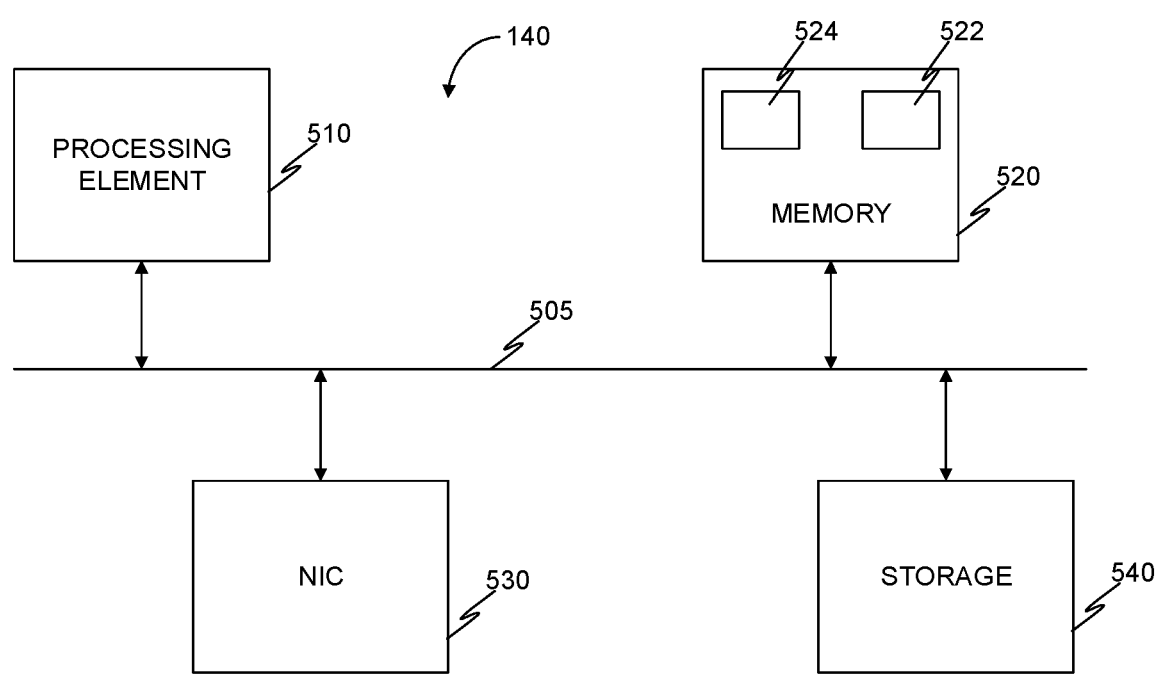
FIG. 5 is a schematic block diagram of a WAF server, implemented in accordance with an embodiment.

FIG. 5 is a schematic block diagram of a WAF server 140, implemented in accordance with an embodiment. The WAF server 140 includes at least one processing element 510, for example, a central processing unit (CPU). In an embodiment, the processing element 510 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing element 510 is coupled via a bus 505 to a memory 520.

The memory 520 may include a memory portion 522 that contains instructions that, when executed by the processing element 510, performs the method described in more detail herein. The memory 520 may be further used as a working scratch pad for the processing element 510, a temporary storage, and for other purposes, as needed. The memory 520 may be a volatile memory such as, but not limited to, random access memory (RAM), or non-volatile memory (NVM), such as, but not limited to, flash memory. Memory 520 may further include memory portion 524 containing received events. The processing element 510 may be coupled to a network interface controller (NIC) 530. The processing element 510 may be further coupled with a storage 540.

Storage 540 may be used for the purpose of holding a copy of the method executed in accordance with the disclosed technique. Storage 540 may be implemented as a distributed storage system to which the WAF server 140 is communicatively coupled via the NIC 530. The processing element 510 and/or the memory 520 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. The machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer-implemented method for configuring a web application firewall (WAF), the method comprising:
   continuously receiving requests related to a first WAF, each request indicative of network traffic directed to a web application protected by the first WAF;
   enriching each received request by associating each received request with information from an enrichment source;
   periodically analyzing the enriched requests;
   generating at least one network traffic rule based on the periodic analysis; and
   configuring at least a second WAF, that is not the first WAF, to perform the at least one network traffic rule each time when one of the at least one network traffic rule is generated.

2. The computer-implemented method of claim 1, further comprising:
   storing the enriched requests in a database, wherein the periodically analyzing is performed on the enriched requests stored in the database.

3. The computer-implemented method of claim 1, wherein enriching each received request further comprises:
   associating each received request with IP status information and a timestamp.

4. The computer-implemented method of claim 3, wherein the IP status information includes at least one of: IP reputation feeds, IP geolocation databases, white lists, blacklists, Open Web Application Security Project (OWASP) tagging, and global events.

5. The computer-implemented method of claim 1, wherein enriching each received request further comprises:
   associating each received request with data collected from at least one data source, wherein the at least one data source includes Internet-based services.

6. The computer-implemented method of claim 1, wherein the periodically analyzing the enriched requests further comprises:
   analyzing each enriched request that has been changed to determine whether the at least one network traffic rule is required to be generated.

7. The computer-implemented method of claim 6, wherein a change in an enriched request includes any one of: a new enrichment source added to the request, a new edge in a graph database storing the enriched request, and an updated label in the enriched request.

8. The computer-implemented method of claim 1, further comprising:
   classifying events included in the enriched requests into a first group, wherein the classifying is based on at least one network parameter; and generating the at least one network traffic rule based on the events in the first group.

9. The computer-implemented method of claim 1, further comprising:
   clustering the received requests based on a timeframe associated with the request to generate at least one cluster;
   matching newly received requests to each of the generated at least one cluster;
   detecting an anomalous request based on the matching; and
   generating at least one other network traffic rule defining how to process the anomalous request.

10. The computer-implemented method of claim 1, further comprising:
    generating the at least one network traffic rule in a notation that complies with the second WAF.

11. A non-transitory computer readable medium having stored thereon instructions for causing a processing circuitry to execute a process for configuring a web application firewall (WAF), the process comprising:
    continuously receiving requests related to a first WAF, each request indicative of network traffic directed to a web application protected by the first WAF;
    enriching each received request by associating each received request with information from an enrichment source;
    periodically analyzing the enriched requests;
    generating at least one network traffic rule based on the periodic analysis; and
    configuring at least a second WAF, that is not the first WAF, to perform the at least one network traffic rule each time when one of the at least one network traffic rule is generated.

12. A system for a process for configuring a web application firewall (WAF), comprising:
    a processing circuitry; and a memory, the memory containing instructions that, when executed by the processing circuitry, configure the system to:

continuously receive requests related to a first WAF, each request indicative of network traffic directed to a web application protected by the first WAF;

enrich each received request by associating each received request with information from an enrichment source;

periodically analyze the enriched requests;

generate at least one network traffic rule based on the periodic analysis; and configure at least a second WAF, that is not the first WAF, to perform the at least one network traffic rule each time when one of the at least one network traffic rule is generated.

13. The system of claim 12, wherein the system is further configured to:

store the enriched requests in a database, wherein the periodically analyzing is performed on the enriched requests stored in the database.

14. The system of claim 12, wherein the system is further configured to:

associate each received request with IP status information and a timestamp.

15. The system of claim 14, wherein the IP status information includes at least one of: IP reputation feeds, IP geolocation databases, whitelists, blacklists, Open Web Application Security Project (OWASP) tagging, and global events.

16. The system of claim 12, wherein the system is further configured to:

associate each received request with data collected from at least one data source, wherein the at least one data source includes Internet-based services.

17. The system of claim 12, wherein the system is further configured to:

analyze each enriched request that has been changed to determine whether the at least one network traffic rule is required to be generated.

18. The system of claim 17, wherein a change in an enriched request includes any one of: a new enrichment source added to the request, a new edge in a graph database storing the enriched request, and an updated label in the enriched request.

19. The system of claim 17, wherein the system is further configured to:

classify events included in the enriched requests into a first group, wherein the classifying is based on at least one network parameter; and generate the at least one network traffic rule based on the events in the first group.

20. The system of claim 17, wherein the system is further configured to:

cluster the received requests based on a timeframe associated with the request to generate at least one cluster;

match newly received requests to each of the generated at least one cluster;

detect an anomalous request based on the matching; and generate at least one other network traffic rule defining how to process the anomalous request.

21. The system of claim 12, wherein the system is further configured to:

generate the at least one network traffic rule in a notation that complies with the second WAF.

* * * * *